(12) United States Patent
Edwards

(10) Patent No.: US 6,443,231 B1
(45) Date of Patent: Sep. 3, 2002

(54) DEVICE FOR ELEVATING A HORSE HOOF

(76) Inventor: Steven R. Edwards, 2818 Murfreesboro Rd., Woodbury, TN (US) 37190

( * ) Notice: Subject to any disclaimer, the term of this patent is extended or adjusted under 35 U.S.C. 154(b) by 0 days.

(21) Appl. No.: 09/775,736

(22) Filed: Feb. 2, 2001

(51) Int. Cl.$^7$ ................................................. A01L 1/00
(52) U.S. Cl. ........................................ 168/1; D30/147
(58) Field of Search ........................... 168/1, 2, 11, 12, 168/13, 18; D30/147

(56) References Cited

U.S. PATENT DOCUMENTS

| | | | |
|---|---|---|---|
| 120,119 A | | 10/1871 | Stansel |
| 646,842 A | * | 4/1900 | Konig ............................ 168/2 |
| 869,838 A | * | 10/1907 | Green .......................... 168/11 |
| 1,083,968 A | * | 1/1914 | Whitaker ....................... 168/1 |
| 1,453,905 A | * | 5/1923 | Blackman ...................... 168/1 |
| 3,970,149 A | * | 7/1976 | Featherstone ............. D30/147 |
| 4,212,356 A | | 7/1980 | Battle |
| 4,470,466 A | | 9/1984 | Nakanishi |
| 4,736,800 A | | 4/1988 | Rohner |
| D295,907 S | | 5/1988 | Decker |
| 4,981,010 A | | 1/1991 | Orza et al. |
| 5,224,549 A | * | 7/1993 | Lightner ...................... 168/18 |
| 5,330,008 A | | 7/1994 | Sigafoos et al. |
| 5,699,861 A | * | 12/1997 | Sigafoos ..................... 168/12 |
| 5,711,377 A | | 1/1998 | Foster |
| 5,715,661 A | | 2/1998 | Meyers |
| D422,383 S | | 4/2000 | Robison |

\* cited by examiner

Primary Examiner—Charles T. Jordan
Assistant Examiner—Elizabeth Shaw
(74) Attorney, Agent, or Firm—Pitts & Brittian, P.C.

(57) ABSTRACT

A device for elevating a horse hoof to encourage the horse to lift the opposite hoof for shoeing. The device includes primarily a sock configured to be releasably mounted on a horse hoof and at least one riser secured to the sock for elevating the horse hoof. The sock is fabricated of a pliable material and is configured to conform to the hoof of the horse when attached. An opening is provided in the rear of the sock to enable mounting and dismounting of the sock on the hoof. A fastening device is carried by the sock to secure the sock to the hoof to prevent unselected removal. The sock is carried by a primary riser. The primary riser is comprised of a plurality of riser pads stacked one on top of another. The riser pads are secured to each other in a conventional manner. A horseshoe is mounted on the bottom surface of the primary riser in order to enhance the durability of the bottom riser pad. A crease is defined on the bottom surface of the horseshoe to provide traction for the horse and to prevent wear of the primary riser. In order to further elevate the horse, a secondary riser is provided. The secondary riser is constructed in much the same manner as the primary riser. However, the secondary riser may define an overall height different than the primary riser. A through opening is defined by the secondary riser to receive a bolt. The primary riser defines a threaded bolt receptor for receiving the distal end of a bolt.

18 Claims, 3 Drawing Sheets

DEVICE FOR ELEVATING A HORSE HOOF

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of Invention

This invention relates to the field of horses. More specifically, the present invention is related to a device for assisting a farrier in shoeing a horse.

2. Description of the Related Art

In the field of horse shoeing, it is well known that one shoes horses, known as a farrier, must lift the hoof to be shoed in order to remove an existing shoe, clean the hoof, and/or replace the shoe. Typically, this requires the farrier to bend down, placing himself in a precarious position. Depending upon the temperament of the horse, the farrier may be in danger of being kicked when working with the hooves of the horse. Some horses are not cooperative when a farrier attempts to lift a hoof for examination or care. Accordingly, it is preferable that the farrier be in a defensible position at all times while working with the horse.

While the safety of the farrier with respect to the temperament of the horse is of concern, it is also a concern that the farrier protect his back from damage caused by working in a bent over position. It is well known that working in a bent position—i.e., lifting, pulling, etc.—will advance the rate of deterioration of the spine, and especially the lumbar spine.

Several devices have been provided for use in association with the hoof of a horse. Typical of the art are those devices disclosed in the following U.S. Patents:

| U.S. Pat. No. | Inventor(s) | Issue Date |
| --- | --- | --- |
| Des. 295,907 | V. G. Decker | May 24, 1988 |
| Des. 422,383 | T. L. Robison | April 4, 2000 |
| 120,119 | G. Stansel | October 17, 1871 |
| 4,212,356 | J. R. Battle | July 15, 1980 |
| 4,470,466 | K. Nakanishi | September 11, 1984 |
| 4,736,800 | H. Rohner | April 12, 1988 |
| 4,981,010 | F. Orza et al. | January 1, 1991 |
| 5,330,008 | R. D. Sigafoos et al. | July 19, 1994 |
| 5,711,377 | B. L. Foster | January 27, 1998 |
| 5,715,661 | C. A. Meyers | February 10, 1998 |

Of these devices, those disclosed by Decker (D'907), Battle ('356), and Nakanishi ('466) are various styles of nail-less horseshoes. The D'907 device includes primarily a U-shaped pad for engaging the underneath of the horse hoof, with a side wall disposed on the outer perimeter of the pad. Each of the pad and the side are provided with deformations on their inner surface, presumably provided for gripping the horse hoof to prevent unintended removal therefrom. The '466 device further adds a strap for circumventing the rear of the hoof and connecting to either side of the side wall. The strap is carried at one terminating end of the side wall, and releasably connected to the opposing terminating end. The '356 device discloses a side wall that substantially circumvents the horse hoof, and is provided with a belt and buckle as a securing mechanism.

The Rohner ('800), Orza et al. ('010), Sigafoos et al. ('008), and Meyers ('661) devices are each provided as protective covers or boots for horse hooves. Each includes a sole having a lower gripping surface, a side wall for substantially encircling at least the hoof of the horse, and a fastening mechanism for preventing unselected removal of the device from the horse hoof.

The remaining devices are provided for elevating a horse hoof for a selected purpose. The D'383 (Robison) device is provided for elevating the healthy claw of a cleft-footed animal. Stansel ('119) discloses a device for elevating the hoof of a horse while that hoof is being shoed. Foster ('377) discloses a device to be nailed to the hoof of a gaited performance horse.

BRIEF SUMMARY OF THE INVENTION

The present invention is a device for elevating a horse hoof to encourage the horse to lift the opposite hoof for shoeing. The device is designed to be releasably mounted on the horse hoof in a non-destructive manner. Further, the device is designed to be adjustable in height to accommodate various breeds and heights of horses.

The device includes primarily a sock configured to be releasably mounted on a horse hoof and at least one riser secured to the sock for elevating the horse hoof. The sock is fabricated of a pliable material and is configured to conform to the hoof of the horse when attached. An opening is provided in the rear of the sock to enable mounting and dismounting of the sock on the hoof. A strap is secured to the sock on each side of the opening and is configured to extend across the opening and wrap around a portion of the sock. A hook-and-loop type fastener is carried by the distal end of each strap to secure the strap to the sock. The hook portion of the hook-and-loop type fastener is carried by the distal end of the strap, while the outer surface of the sock serves as the loop portion, thereby enabling the securement of the strap directly to the sock.

The sock is mounted to a primary riser. A rigid plate is provided to cover at least the lower fringe of the sock and to be mounted to the top of the primary riser. A plurality of set screws are provided to mount the rigid plate on the primary riser, the heads of which are countersunk such that they are not engaged by the hoof when inserted into the sock.

The primary riser is comprised of a plurality of riser pads stacked one on top of another. The riser pads are secured to each other in a conventional manner, such as by bolts which extend from the bottom riser pad to the top riser pad. A horseshoe is mounted on the bottom surface of the primary riser in order to enhance the durability of the bottom riser pad. A crease is defined on the bottom surface of the horseshoe to provide traction for the horse and to prevent wear of the primary riser. A plurality of nails are provided to secure the horseshoe to the primary riser, the nails being received in a plurality of openings defined within the crease.

In order to elevate the horse higher, a secondary riser is provided. The secondary riser is constructed in much the same manner as the primary riser. However, the secondary riser may define an overall height different than the primary riser. A through opening is defined by the secondary riser to receive a bolt. To this extent, the primary riser defines a threaded bolt receptor for receiving the distal end of a bolt. The secondary riser is thus secured to the primary riser by inserting the bolt through the secondary riser through opening and then engaging the bolt with the primary riser threaded receptor.

BRIEF DESCRIPTION OF THE SEVERAL VIEWS OF THE DRAWINGS

The above mentioned features of the invention will become more clearly understood from the following detailed description of the invention read together with the drawings in which.

DETAILED DESCRIPTION OF THE INVENTION

Figure 1:
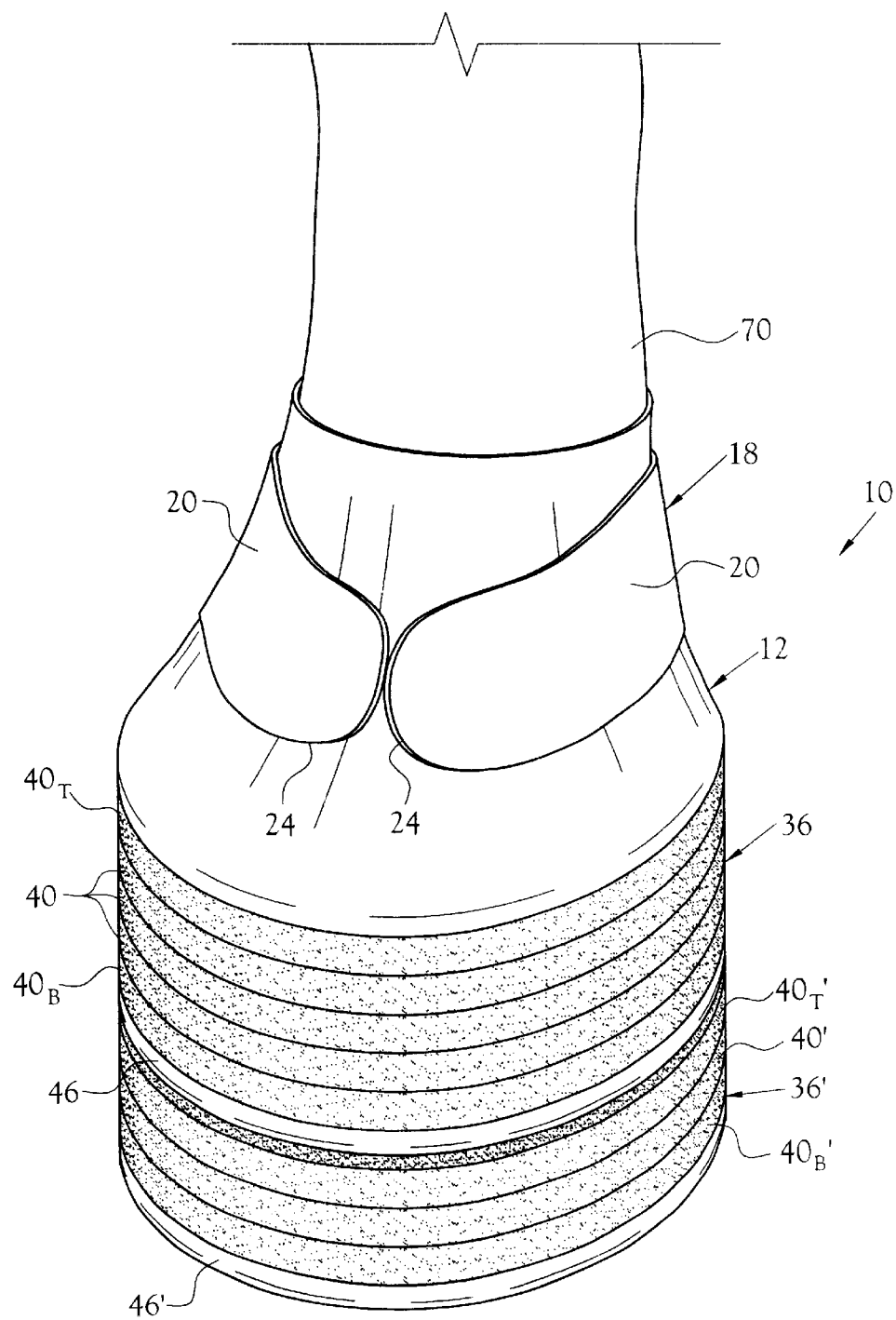
FIG. 1 is a perspective view of the device for elevating a horse hoof constructed in accordance with several features of the present invention showing the device mounted on a horse hoof.
Figure 2:
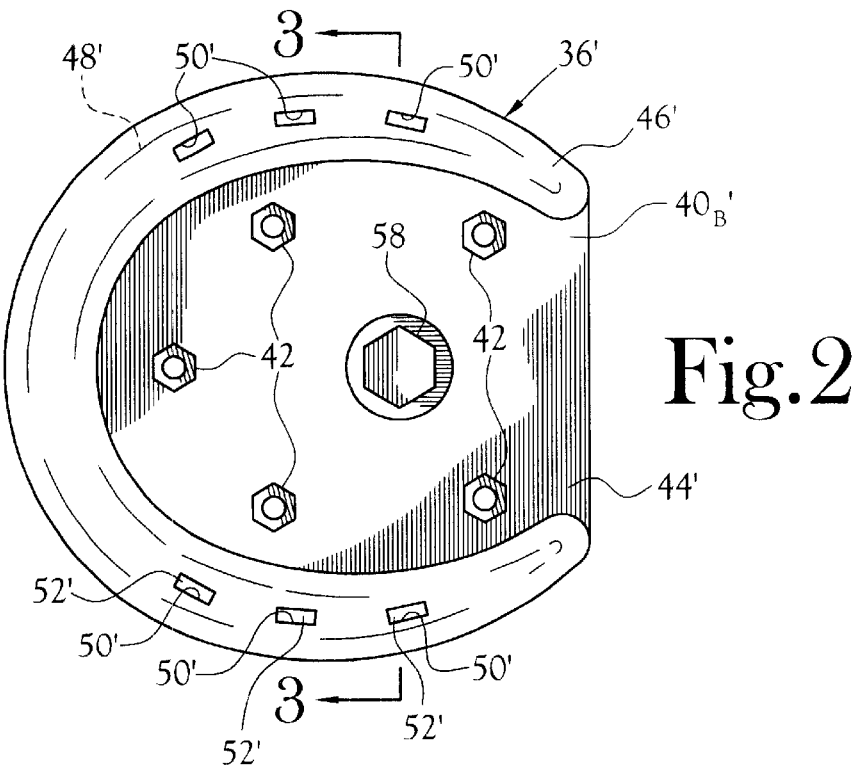
FIG. 2 is a bottom plan view of the device for elevating a horse hoof of FIG. 1.

A device for elevating a horse hoof incorporating various features of the present invention is illustrated generally at 10 in the figures. The device for elevating a horse hoof, or device 10, is designed for elevating one hoof 70 of a horse to encourage the horse to lift the opposite hoof for shoeing. The device 10 is designed to be releasably mounted on the horse hoof 70 in a non-destructive manner. In the preferred embodiment the device 10 is designed to be adjustable in height to accommodate various breeds and heights of horses.

The device 10 of the present invention includes primarily a sock 12 configured to be releasably mounted on a horse hoof 70 and at least one riser 36 secured to the sock 12 for elevating the horse hoof 70. The sock 12 is fabricated of a pliable material and is configured to conform to the hoof 70 of the horse when attached. In the illustrated embodiment, an opening 14 is provided in the rear of the sock 12 to enable receipt of the hoof 70 within the sock 12. A securement device 18 is provided for releasably securing the sock 12 to the horse. In the illustrated embodiment, a strap 20 is secured at its proximal end 22 to the sock 12 on each side of the opening 14 and is configured to extend across the opening 14 and wrap around at least a portion of the sock 12. A fastener 26 such as the illustrated hook-and-loop type fastener is carried by the distal end 24 of each strap 20 to secure the strap 20 to the sock 12. To this extent, in the illustrated embodiment, the hook portion 28 of the hook-and-loop type fastener is carried by the distal end 24 of the strap 20, while the outer surface of the sock 12 serves as the loop portion 30, thereby enabling the securement of the strap 20 directly to the sock 12.

It will be understood that other embodiments of the sock 12 and securement device 20 may be incorporated as well. Further, other types of conventional fasteners 26 may be used in lieu of the hook-and-loop type fastener as described. Further, it will be understood that fewer or more than two straps 20 may be incorporated.

Figure 3:
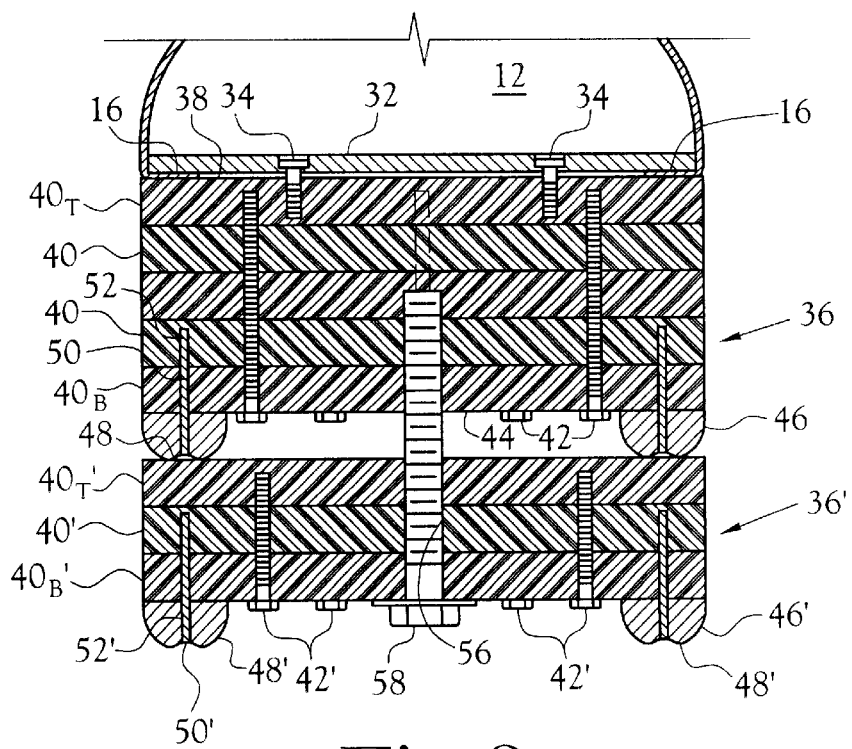
FIG. 3 is a rear elevation view, in section taken along 3—3 of FIG. 2.
Figure 4:
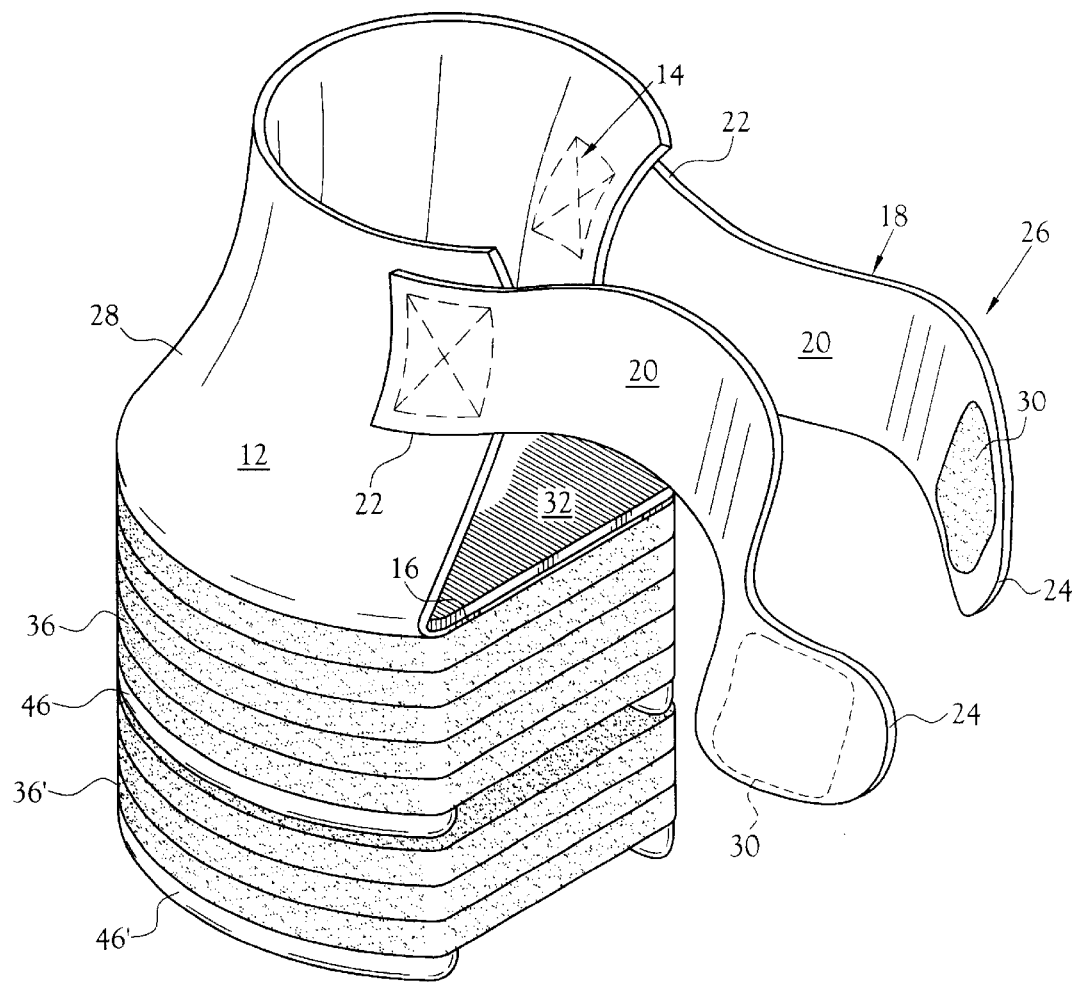
FIG. 4 is a rear perspective view of the device for elevating a horse hoof.

The sock 12 is mounted to a primary riser 36. As illustrated most clearly in FIG. 3, a rigid plate 32 is provided to cover at least the lower fringe 16 of the sock 12 and to be mounted to the top 38 of the primary riser 36. A plurality of fasteners 34 are provided to mount the rigid plate 32 to the primary riser 36. In the illustrated embodiment, set screws are provided, the heads of which are countersunk such that they are not engaged by the hoof 70 when inserted into the sock 12.

The primary riser 36 is comprised of a plurality of riser pads 40 stacked one on top of another. The riser pads 40 are secured to each other in a conventional manner, such as by the illustrated bolts 42 which extend from the bottom riser pad 40$_B$ to the top riser pad 40$_T$. It will also be understood that the riser pads 40 may be secured to each other using an adhesive or other conventional fastener. It will also be understood that the primary riser 36 may be integrally formed. In the illustrated embodiment, five (5) riser pads 40 are provided, each defining a thickness of approximately one-half inch (½"). Each riser pad 40 is fabricated from a lightweight yet durable material. In the preferred embodiment, the riser pads 40 are fabricated from plastic.

A horseshoe 46 is mounted on the bottom surface 44 of the primary riser 36 in order to enhance the durability of the bottom riser pad 40$_B$. A crease 48 is defined on the bottom surface of the horseshoe 46 to provide traction for the horse and to prevent wear of the primary riser 36. A plurality of nails 52 are provided to secure the horseshoe 46 to the primary riser 36, the nails 52 being received in a plurality of openings 50 defined within the crease 48. The horseshoe 46 is fabricated from a lightweight yet durable material such as aluminum. The horseshoe 46 defines a thickness of approximately one-half inch (½). Accordingly, the overall height of the primary riser 36 in the illustrated embodiment is three inches (3"). Including the thickness of the rigid plate 32, when the farrier uses only the primary riser 36, the horse is elevated approximately 3¼".

In order to elevate the horse higher, a secondary riser 36" is provided. In the illustrated embodiment, the secondary riser 36" is constructed in much the same manner as the primary riser 36. However, the secondary riser 36' of the illustrated embodiment includes three (3) riser pads 40' such that the overall height of the secondary riser 36' is approximately two inches (2"). A through opening 56 is defined by the secondary riser 36' to receive a bolt 58. To this extent, the primary riser 36 defines a threaded bolt receptor 54 for receiving the distal end of the bolt 58. The secondary riser 36' is thus secured to the primary riser 36 simply by inserting the bolt 58 through the secondary riser through opening 56 and then engaged with the primary riser threaded receptor 54. Further secondary risers 36' may be incorporated as required, with the length of the bolt 58 being chosen to accommodate the overall height of the secondary riser(s) 36', with sufficient length to engage the primary riser threaded opening 54.

In use, the desired height of the device 10 is selected based upon the height of the horse. When a taller device 10 is required, the secondary riser 36' is secured to the bottom 44 of the primary riser 36. The hoof 70 opposite that to be shoed, or to otherwise be manipulated, is inserted into the sock 12 and the securement device 18 engaged to prevent unselected removal from the hoof 70. Once the device 10 is secured on the horse hoof 70, the hoof 70 is then released such that the horse places its weight thereon. The natural tendency of the horse, once one hoof 70 is elevated, is to lift its opposing hoof, as it cannot support weight on both hooves when disposed at different elevations. Therefore, once the horse lifts the desired hoof, the farrier does not have to bend over as far to shoe the hoof, nor does he have to continuously encourage the horse to lift its hoof. Through testing of the present invention, it has been found that horses tend to accept the present invention with little or no resistance.

From the foregoing description, it will be recognized by those skilled in the art that a device for elevating a horse hoof offering advantages over the prior art has been provided. Specifically, the device is provide for elevating one hoof of a horse to encourage the horse to lift the opposite hoof for shoeing. The device is designed to be releasably mounted on the horse hoof in a non-destructive manner. Further, the device is adjustable in height to accommodate various breeds and heights of horses.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, I claim:

1. A device for elevating a horse hoof, said device comprising:
   a sock configured to be releasably mounted on a horse hoof, said sock being fabricated of a pliable material and configured to conform to the horse hoof; and
   a primary riser secured to said sock for elevating the horse hoof, wherein said primary riser includes:
      a plurality of riser pads, said plurality of riser pads being disposed in a stacked configuration, said plurality of riser pads being secured one to another in a conventional manner; and
      a horseshoe mounted on a bottom surface of a bottom one of said plurality of riser pads, said horseshoe defining a crease for providing traction and for preventing wear of said primary riser.

2. The device of claim 1 wherein said sock defines an opening from a bottom edge to a top edge to enable receipt of the horse hoof in said sock, said device further comprising a securement device for releasably securing said sock to the horse hoof.

3. The device of claim 2 wherein said securement device includes at least one strap, said strap being secured to said sock on one side of said opening and configured to extend across said opening and around at least a portion of said sock, said device further comprising a fastener for fastening a distal end of said strap to said sock.

4. The device of claim 3 wherein said fastener is a hook-and-loop type fastener including a hook portion and a loop portion, said hook portion being carried by said distal end of said strap, and said hook portion being carried an outer surface of said sock.

5. The device of claim 4 wherein said hook portion of said hook-and-loop type fastener is defined by said outer surface of said sock.

6. The device of claim 1 further comprising:
   a rigid plate disposed to cover at least a lower fringe of said sock and to be mounted to a top of said primary riser; and
   at least one fastener for mounting said rigid plate to said primary riser.

7. A device for elevating a horse hoof, said device comprising:
   a sock configured to be releasably mounted on a horse hoof, said sock being fabricated of a pliable material and configured to conform to the horse hoof;
   a primary riser secured to said sock for elevating the horse hoof;
   at least one secondary riser removable securable to said primary riser to further elevate the horse hoof;
   a riser securement device for removably securing said at least one secondary riser to said primary riser;
   a rigid plate disposed to cover at least a lower fringe of said sock and to be mounted to a top of said primary riser; and
   at least one fastener for mounting said rigid plate to said primary riser.

8. The device of claim 7 wherein said sock defines an opening from a bottom edge to a top edge to enable receipt of the horse hoof in said sock, said device further comprising a securement device for releasably securing said sock to the horse hoof.

9. The device of claim 8 wherein said securement device includes at least one strap, said strap being secured to said sock on one side of said opening and configured to extend across said opening and around at least a portion of said sock, said device further comprising a fastener for fastening a distal end of said strap to said sock.

10. The device of claim 9 wherein said fastener is a hook-and-loop type fastener including a hook portion and a loop portion, said hook portion being carried by said distal end of said strap, and said hook portion being carried an outer surface of said sock.

11. The device of claim 10 wherein said hook portion of said hook-and-loop type fastener is defined by said outer surface of said sock.

12. The device of claim 7 wherein said primary riser includes:
   a plurality of riser pads, said plurality of riser pads being disposed in a stacked configuration, said plurality of riser pads being secured one to another in a conventional manner; and
   a horseshoe mounted on a bottom surface of a bottom one of said plurality of riser pads, said horseshoe defining a crease for providing traction and for preventing wear of said primary riser.

13. The device of claim 7 wherein said at least one secondary riser includes:
   a plurality of riser pads, said plurality of riser pads being disposed in a stacked configuration, said plurality of riser pads being secured one to another in a conventional manner; and
   a horseshoe mounted on a bottom surface of a bottom one of said plurality of riser pads, said horseshoe defining a crease for providing traction and for preventing wear of said primary riser.

14. The device of claim 7 wherein said primary riser defines a threaded receptor, wherein said at least one secondary riser defines a cooperating through opening, and wherein said riser securement device includes a threaded bolt configured to be received through said secondary riser through opening and to cooperate with said primary riser threaded receptor to accomplish removable securement of said secondary riser to said primary riser.

15. A device for elevating a horse hoof, said device comprising:
   a sock configured to be releasably mounted on a horse hoof, said sock being fabricated of a pliable material and configured to conform to the horse hoof;
   a primary riser secured to said sock for elevating the horse hoof
   at least one secondary riser removable securable to said primary riser to further elevate the horse hoof; and
   a riser securement device for removably securing said at least one secondary riser to said primary riser.

16. The device of claim 15 wherein said primary riser defines a threaded receptor, wherein said at least one secondary riser defines a cooperating through opening, and wherein said riser securement device includes a threaded bolt configured to be received through said secondary riser through opening and to cooperate with said primary riser threaded receptor to accomplish removable securement of said secondary riser to said primary riser.

17. The device of claim 15 wherein said at least one secondary riser includes:
   a plurality of riser pads, said plurality of riser pads being disposed in a stacked configuration, said plurality of riser pads being secured one to another in a conventional manner; and
   a horseshoe mounted on a bottom surface of a bottom one of said plurality of riser pads, said horseshoe defining a crease for providing traction and for preventing wear of said primary riser.

18. A device for elevating a horse hoof, said device comprising:

a sock configured to be releasably mounted on a horse hoof, said sock being fabricated of a pliable material and configured to conform to the horse hoof;

a riser secured to said sock for elevating the horse hoof, said riser defining a top surface defining a perimeter similar to the perimeter of a horse hoof;

a rigid plate disposed to cover at least a lower fringe of said sock and to be mounted to a top of said riser, said rigid plate being configured to cover a substantial portion of said riser; and at least one fastener for mounting said rigid plate to said riser.

* * * * *

UNITED STATES PATENT AND TRADEMARK OFFICE
CERTIFICATE OF CORRECTION

PATENT NO.    : 6,443,231 B1
DATED         : September 3, 2002
INVENTOR(S)   : Steven R. Edwards It is certified that error appears in the above-identified patent and that said Letters Patent is hereby corrected as shown below:

<u>Title page,</u>
Item [76], please change "2818 Murfreesboro Road" to read
-- 2181 Murfreesboro Road --.

Signed and Sealed this

Fourth Day of February, 2003

JAMES E. ROGAN
*Director of the United States Patent and Trademark Office*